United States Patent [19]

Wheeler

[11] Patent Number: 5,255,545
[45] Date of Patent: * Oct. 26, 1993

[54] GOOSENECK TRAILER HITCH LOCKING DEVICE

[75] Inventor: James M. Wheeler, Rte. 1, Box 162, Willard, Mo. 65781

[73] Assignees: James M. Wheeler; Louise K. Wheeler, both of Willard, Mo.

[*] Notice: The portion of the term of this patent subsequent to Jan. 26, 2010 has been disclaimed.

[21] Appl. No.: 864,570

[22] Filed: Apr. 7, 1992

Related U.S. Application Data

[63] Continuation-in-part of Ser. No. 693,817, Apr. 30, 1991, Pat. No. 5,181,405.

[51] Int. Cl.$^5$ ............................................. F16B 41/00
[52] U.S. Cl. ....................................... 70/232; 70/258; 280/507
[58] Field of Search ............... 70/57, 58, 232, 258, 70/DIG. 57; 280/507

[56] References Cited

U.S. PATENT DOCUMENTS

| | | | |
|---|---|---|---|
| 2,440,744 | 5/1948 | Grinnell et al. | 70/232 |
| 2,656,706 | 10/1953 | Lucas et al. | 280/507 |
| 2,785,564 | 3/1957 | Rossi . | |
| 2,969,993 | 1/1961 | Jasper . | |
| 3,662,320 | 5/1972 | Mark | 70/57 X |
| 3,763,675 | 10/1973 | Hofmeiter et al. | 70/232 |
| 3,922,897 | 12/1975 | Mickelson | 70/232 |
| 4,141,233 | 2/1979 | Reyes | 70/232 |
| 4,407,146 | 10/1983 | Nielsen, Jr. | 70/232 |
| 4,444,031 | 4/1984 | Watson | 70/232 |
| 4,571,964 | 2/1986 | Bratzler | 70/58 |
| 4,620,718 | 11/1986 | Mickelson | 280/507 |
| 4,691,935 | 9/1987 | Brandt | 280/507 |
| 5,052,203 | 10/1991 | Van Cuyk | 70/232 |

FOREIGN PATENT DOCUMENTS

| | | | |
|---|---|---|---|
| 584555 | 10/1958 | Italy | 70/232 |
| 959271 | 5/1964 | United Kingdom | 70/DIG. 57 |
| 2215769A | 9/1989 | United Kingdom | 70/58 |

Primary Examiner—Lloyd A. Gall
Attorney, Agent, or Firm—Wm. Bruce Day

[57] ABSTRACT

An improved gooseneck trailer hitch locking device for obstructing a gooseneck coupler to prevent undesired coupling by a towing vehicle, the locking device comprising lock bodies cooperating with and obstructing the front and rear facing portions of a gooseneck coupler, a lock pin securing the lock bodies to each other and having a lock device for preventing access to the lock pin and undesired removal of the lock bodies from the coupler. The lock bodies include apertures which can be aligned with each other and with a bore centrally disposed in a downward projection extending from one of the lock bodies. The lock pin is received by the bore and can be extended into the aligned apertures in the lock bodies when aligned to secure the lock bodies to each other.

5 Claims, 5 Drawing Sheets

GOOSENECK TRAILER HITCH LOCKING DEVICE

RELATED APPLICATION

This application is a continuation in-part of application Ser. No. 07/693,817, filed Apr. 30, 1991, U.S. Pat. No. 5,181,405.

FIELD OF THE INVENTION

This invention relates to trailers attached to pull vehicles in general and in particular to an improved gooseneck trailer hitch lock.

BACKGROUND OF THE INVENTION

Trailers attached to pull vehicles are commonly used to transport machinery, livestock, and other goods. When the trailer is unhitched from the pull vehicle, the trailer and its goods are subject to theft by undesired coupling to some other towing or pull vehicle. Trailer hitches are of a limited variety, frequently being of standard types of shapes. Examples are ball and socket hitching devices in which the trailer coupler consists of a socket which mounts on a ball attached to the pull vehicle; king pin hitches which consist of cylindrical posts containing circumferential recesses and fit into matching openings mounted on the pull vehicle; and gooseneck hitches. The typical or standard gooseneck hitch consists of an irregular or non-symmetrical coupler foot plate attached to the lower end of a generally vertical post, the upper end of which post is attached to the trailer. The post in gooseneck hitches may have a horizontal component or beam at its upper end, which horizontal component or beam attaches to the front of the trailer. The coupler at the lower end of the post generally connects with a receiving device on the pull vehicle. The coupler itself consists of front and rear facing portions of different shapes and configurations.

To prevent undesired coupling of trailers to other pull vehicles, locks have been devised to fit over the ball or over or within the socket of a ball and socket-type hitch. Similarly, locking devices have been devised to enclose the king pin or hitch post of trailers having king pin-type couplers. Such locking devices, however, are not generally used or adapted for use with gooseneck hitch couplers.

There is a need for a durable, inexpensive, simply operated, and effective trailer hitch lock for trailers with gooseneck hitches having non-symmetrical or irregularly shaped couplers. Locking devices for king pin or ball and socket hitches cannot be used on gooseneck couplers, because such locking devices will not fit around or be attachable to the coupler of a gooseneck hitch. The gooseneck trailer hitch lock should surround the coupler of the gooseneck, thus cooperating with it to obstruct the coupler as to prevent undesired coupling with another towing vehicle. Such locking device should further contain means to prevent its undesired removal from the coupler.

OBJECTS OF THE INVENTION

The objects of the present invention are: to provide a locking device for a gooseneck trailer hitch which cooperates with and obstructs a coupler portion of the hitch so as to prevent undesired coupling of the coupler with a pull or towing vehicle; to provide such locking device with a lock or other means to secure the locking device to the coupler of the gooseneck trailer hitch to prevent undesired removal of the locking device from the coupler; to provide a locking device shaped and adapted to receive both the front and rear facing portions of a standard coupler design associated with the gooseneck trailer hitch; to provide means to adjust said locking device to properly fit the coupler; to provide a locking device which is strong, durable and configured to resist removal by cutting, prying, or other forcible or destructive means; to provide a locking device which is inexpensive to make; to provide such a locking device which can be easily installed and removed and easily locked and unlocked with a tool, tumbler combination, key, wrench, or the like; to provide an internal lock pin or setscrew to fix the locking device around the coupler of the gooseneck hitch so that it cannot be separated or removed from the coupler or otherwise loosened around the coupler; to provide such a locking device with an internal lock pin or setscrew to prevent easy access to the lock pin or setscrew; to provide a locking device with appropriate apertures and bores to receive the lock pin or setscrew and secure or lock it in place; to provide such a locking device in a single assembly so that it can be easily stored and not subject to loss of individual pieces or components of the assembly; to provide such a locking device which can be slidably adjusted to accommodate irregularities in the size or shape of couplers on gooseneck trailer hitches; to provide such a locking device with an internal lock pin having a key and a key insert for engaging an internal lock pin to fix the locking device around the coupler of the gooseneck hitch to resist or prevent forcible or destructive removal of the locking device from the coupler.

Other objects and advantages of this invention will become apparent from the following description taken in conjunction with the accompanying drawings wherein are set forth, by way of illustration and example, certain embodiments of this invention.

SUMMARY OF THE INVENTION

The locking device disclosed and claimed is for use with a trailer gooseneck, the trailer gooseneck having a post with upper and lower ends, the upper end being attached to a trailer and the lower end being attached to a coupler, the coupler having front and rear facing portions and being adapted for releasable attachment to a towing vehicle, said locking device comprising obstruction means for cooperation with the coupler to prevent undesired coupling of the coupler to the towing vehicle and securing means cooperating with said obstruction means to prevent undesired removal of said obstruction means from the coupler.

The locking device disclosed and claimed in one preferred form involves a first lock body which slidably receives a second lock body, the lock bodies being adapted to cooperate with and surround a coupler of a gooseneck coupler to prevent undesired coupling. The first and second lock bodies are adapted to receive the rear and front facing portions, respectively, of the coupler and slide together around the coupler to obstruct it and thus prevent undesired coupling to a towing vehicle. The first and second lock bodies include apertures which can be aligned by the slidable adjustment of the first and second lock bodies. A lock pin or setscrew can be inserted into the aligned apertures. The lock pin or setscrew can access the aligned apertures of the first and second lock bodies by insertion into and through a longitudinal bore in a downward projection extending from the bottom of the first lock body, which downward projection having an internal lock device to prevent undesired access to the lock pin or setscrew and undesired access to the coupler. The downward projection can be made to receive the lock pin or setscrew so that the lock pin or setscrew can be operated with a key, a screwdriver, "ALLEN" wrench, or other suitable tool. The internal lock device prevents undesired access to the improved locking device when the internal lock device is engaged and locked.

DETAILED DESCRIPTION OF THE INVENTION

As required, detailed embodiments of the present invention are disclosed herein; however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Figure 1:
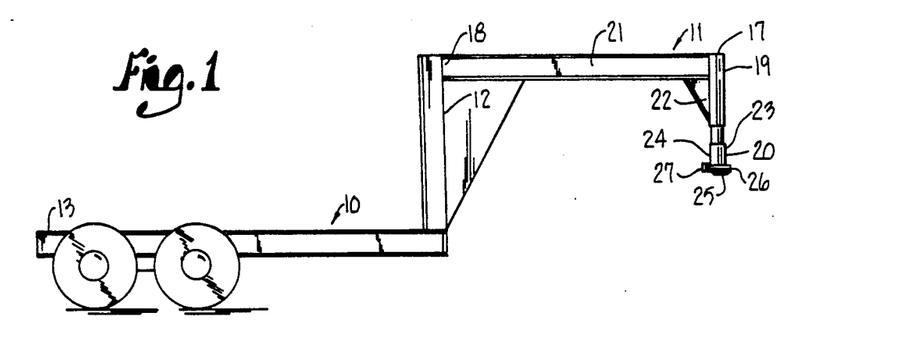
FIG. 1 is a fragmentary, side elevational view of a trailer showing a gooseneck trailer hitch.

Referring to the drawings in more detail:

FIG. 1 generally shows a trailer 10 with a gooseneck trailer hitch 11 mounted on a front facing portion 12 of the trailer 10, the front facing portion 12 being opposite a rear facing portion 13 of the trailer 10. The front facing portion 12 of trailer 10 is connected to a towing or pull vehicle via the gooseneck trailer hitch 11 and is the leading or forward aspect of trailer 10 when pulled in a forward direction by the towing or pulling vehicle.

The gooseneck trailer hitch 11 has a post 17 with an upper end 18, an elbow 19, a lower end 20, a horizontal component 21, and a vertical component 22. The upper end 18 of post 17 is fixedly attached to front facing portion 12 of trailer 10. The lower end 20 of post 17 is attached to a coupler 25 and has a front facing portion 23 and a rear facing portion 24. The coupler 25 has a front facing portion 26 and a rear facing portion 27, the front and rear facing portions 26 and 27 having the same directional orientations, respectively, as the front facing portion 12 and rear facing portion 13 of trailer 10.

Figure 2:
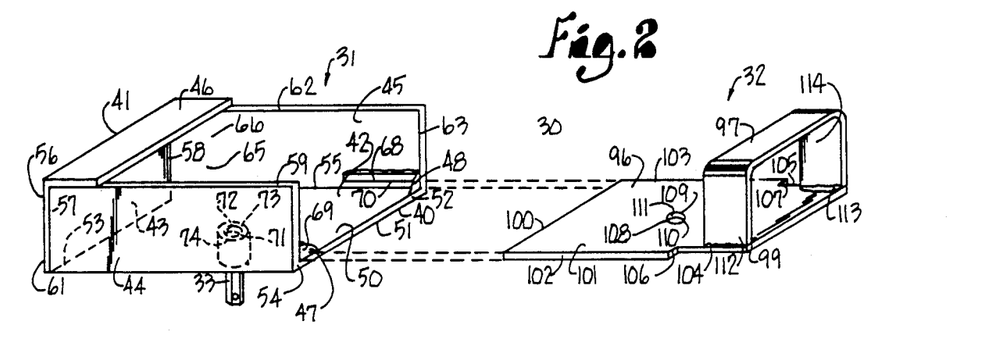
FIG. 2 is a perspective view of a locking device embodying this invention and disclosing first and second lock bodies separated from one another and, in partial phantom lines, a downward projection from the first lock body.

FIG. 2 discloses a locking device 30 for the gooseneck trailer hitch 11, the locking device 30 comprising a first lock body 31, a second lock body 32, and a downward projection 33, the downward projection being adapted to contain lock pin 34 and being further adapted to accommodate padlock 35.

First lock body 31 has a front facing end 40 and an opposite rear facing end 41, the front facing end 40 and rear facing end 41 having the same directional aspects, respectively, as the front facing portion 12 and rear facing portion 13 of trailer 10. First lock body 31 includes a bottom 42, an end piece 43, a first upright side 44, a second upright side 45, a top cover 46, a first stop 47, and a second stop 48.

Bottom 42 of first lock body 31 has an upper side 50, a lower side 51, a front facing end 52, a rear facing end 53, a first bottom side end 54, and a second bottom side end 55. End piece 43 is attached to or integral with, and extends upright from, rear facing end 53 of bottom 42 and has an upper end 56, a first side end 57, and a second side end 58. First upright side 44 is attached to or integral with, and extends upright from, first bottom side end 54 of bottom 42 and has an upper end 59, a front facing end 60, and a rear facing end 61. Second upright side 45 is attached to or integral with, and extends upright from, second bottom side end 55 of bottom 42 and has an upper end 62, a front facing end 63, and a rear facing end 64. The rear facing end 61 of first upright side 44 is fixedly attached to first side end 57 of end piece 43. The rear facing end 64 of second upright side 45 is fixedly attached to second side end 58 of end piece 43. Top cover 46 is fixedly attached to the respective upper ends 59 and 62 of first and second upright sides 44 and 45 and to the upper end 56 of end piece 43. Top cover 46 extends generally parallel to bottom 42 from the upper end 56 of end piece 43 and terminates between front facing end 40 and rear facing end 41 of first lock body 31 so as to form a cavity 65 in an area associated with and in proximity to the rear facing end 41 of first lock body 31. Cavity 65, having a front facing opening 66, is defined by bottom 42, end piece 43, first upright side 44, second upright side 45, and top cover 46, the cavity 65 being adapted to receive the rear facing portion 27 of coupler 25 of gooseneck trailer hitch 11.

Figure 3:
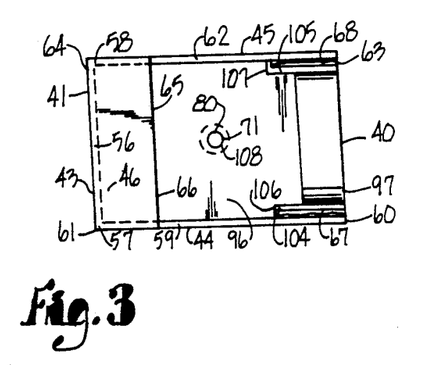
FIG. 3 is a top plan view of the locking device with the second lock body fully received in the first lock body and showing an aperture in the second lock body aligned with and above an aperture in the first lock body.
Figure 4:
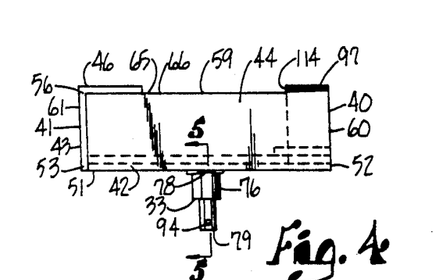
FIG. 4 is a side elevational view of the locking device with the second lock body received in the first lock body and showing the downward projection from the first lock body.

As best shown in FIGS. 2 and 3, first upright side 44 has an inward projection 67 extending inwardly from first upright side 44, and second upright side 45 has an inward projection 68 extending inwardly from second upright side 45. Inward projection 67 is located above, in near proximity to, and generally parallel to, bottom 42. Inward projection 67 extends along upright side 44 between front facing end 60 and rear facing end 61 of first upright side 44. Inward projection 68 is located above, in near proximity to, and generally parallel to, bottom 42. Inward projection 68 extends along second upright side 45 between front facing end 63 and rear facing end 64 of second upright side 45. In the preferred embodiment, inward projections 67 and 68 do not extend the full length of the first and second upright sides 44 and 45, respectively. Inward projection 67, first upright side 44, and bottom 42 form first channel 69. Inward projection 68, second upright side 45, and bottom 42 form second channel 70.

Figures 5, 6, 7, 8:
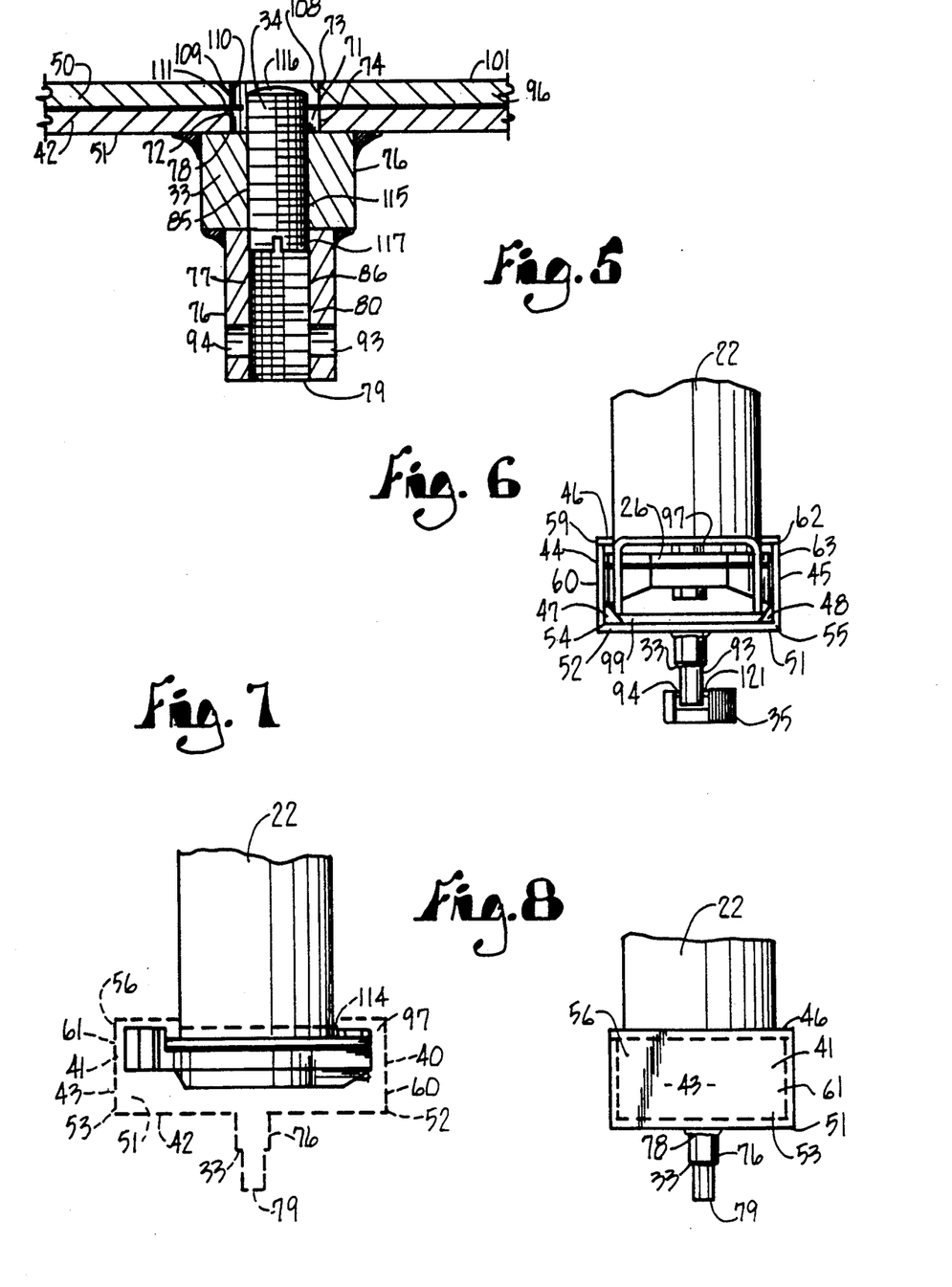
FIG. 5 is an enlarged, partially fragmentary, cross-sectional view taken along lines 5—5, FIG. 4, revealing a lock pin disposed in the downward projection and aligned apertures
FIG. 6 is a front elevational view of the locking device installed and locked on a coupler.
FIG. 7 is a side elevational view of a coupler with phantom lines disclosing the locking device and the downward projection from the first lock body.
FIG. 8 is a back elevational view of the locking device with the second lock body received in the first lock body and showing the downward projection from the first lock body.
Figure 9:
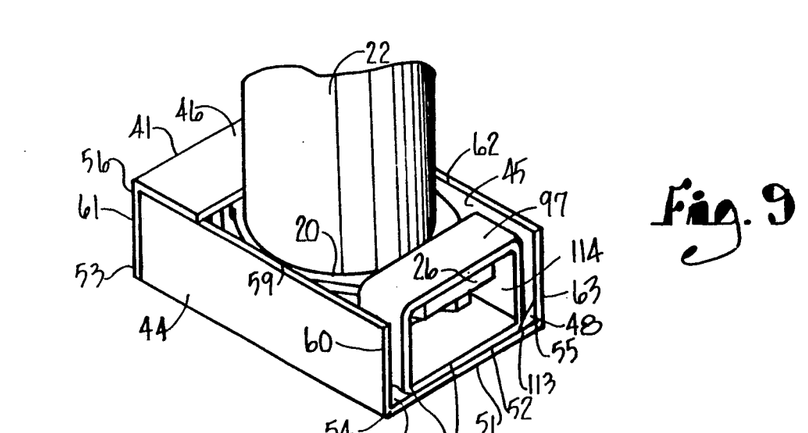
FIG. 9 is a perspective view of the locking device installed on a coupler.

As shown in FIGS. 2, 6 and 9, first stop 47 is fixedly attached to front facing end 52 of bottom 42 and to front facing end 60 of first upright side 44, and second stop 48 is fixedly attached to front facing end 52 of bottom 42 and to front facing end 63 of second upright side 45. Stops 47 and 48 are positioned to obstruct first and second channels 69 and 70, respectively, at the front facing end 40 of first lock body 31.

As shown in FIGS. 2 and 5, an aperture 71 is generally centrally located in bottom 42 and extends completely therethrough. Aperture 71 is further defined by an interior wall 72 terminating in wall upper edge 73 and wall lower edge 74.

Downward projection 33 extends downward from lower side 51 of bottom 42, as shown in FIGS. 2, 4, 5, and 6. Downward projection 33 has an exterior wall 76, an interior surface 77, an upper end 78, and a lower end 79. As best shown in FIG. 5, interior surface 77 defines a generally centrally located, longitudinal bore 80 which extends completely through downward projection 33 from upper end 78 to lower end 79. Interior surface 77 is threaded and adapted to threadably receive lock pin 34. The upper end 78 of downward projection 33 is securely attached to the lower side 51 of bottom 42 in proximity with wall lower edge 74 of aperture 71, such that bore 80 is aligned with and below aperture 71. In an alternative embodiment, bore 80 is defined by an upper interior threaded surface 85 associated with, and in proximity to, upper end 78 and a lower interior surface 86 associated with, and in proximity to, lower end 79. In such alternative embodiment, lower interior surface 86 need not be threaded, provided that portion of bore 80 defined by lower interior surface 86 has a diameter sufficiently larger than that portion of bore 80 defined by upper portion 85 so as to permit passage of lock pin 34 through that portion of bore 80 defined by lower interior surface 86 so that lock pin 34 may be threadably received by that portion of bore 80 defined by upper interior threaded surface 85.

As shown in FIGS. 2 and 5, downward projection 33 includes first opening 93 and second opening 94 with central axes generally perpendicular to the longitudinal axis of bore 80. First opening 93 and second opening 94 are opposite each other, and each extends completely through downward projection 33 from exterior wall 76, to interior surface 77. First opening 93 and second opening 94 are aligned and, in combination with bore 80, provide and define a clear space through and in general proximity with the lower end 79 of downward projection 33.

As best shown in FIG. 2, second lock body 32 comprises a plate 96 and a band 97. Plate 96 has a front facing end 99, a rear facing end 100, an upper side 101, a first side end 102, and a second side end 103. Plate 96 contains and defines first notch 104 in first side end 102 and second notch 105 in second side end 103. First notch 104 extends along first side end 102 from front facing end 99 to first notch end 106, and second notch 105 extends along second side end 103 to second notch end 107. Plate 96 further contains and defines a generally centrally located aperture 108, which extends completely through plate 96. Aperture 108 is further defined by an interior wall 109 terminating in wall upper edge 110 and wall lower edge 111.

For illustrative purposes only, rear facing end 100 of plate 96 is shown to be slidably received in first and second channels 69 and 70 of first lock body 31 such that plate 96 of second lock body 32 may be slidably received by first lock body 31 by inserting rear facing end 100 of plate 96 into first and second channels 69 and 70 at the front facing end 40 of first lock body 31. Once the rear facing end 100 of the plate 96 is received in the first and second channels 69 and 70 of the first lock body 31, the stops 47 and 48 of the first lock body 31 prevent the complete separation of the second lock body 32 from the first lock body 31. Band 97 has an inverted U shape and includes first band end 112 and second band end 113. First band end 112 is fixedly attached to upper side 101 of plate 96 near or in proximity to front facing end 99 and first side end 102 of plate 96. Second band end 113 is fixedly attached to upper side 101 of plate 96 near or in proximity to front facing end 99 and second side end 103 of plate 96. So attached and in inverted U shape, band 97 and plate 96 define slot 114.

As shown in FIG. 5, lock pin 34 is of generally cylindrical shape, having a threaded exterior surface 115, an upper end 116, and a lower end 117. Threaded exterior surface 115 of lock pin 34 is adapted to be threadably received by interior surface 77 of downward projection 33. The lower end 117 of lock pin 34 is adapted to receive an "ALLEN" wrench or a screwdriver or some other suitable tool to rotate lock pin 34. Lock pin 34 may be a standard setscrew of size appropriate to threadably cooperate with interior surface 77 of downward projection 33.

Padlock 35 is preferentially of the "MASTER" type so as to resist cutting, prying, or other destructive removal; said padlock includes shackle 121, as shown in FIG. 6.

Apertures 71 and 108 are located, respectively, in bottom 42 of first lock body 31 and in plate 96 of second lock body 32 such that when plate 96 is slidably adjusted in first and second channels 69 and 70, aperture 108 can be brought into alignment with and above aperture 71, as shown in FIGS. 3 and 5. Apertures 71 and 108 are of sufficient size to receive lock pin 34 through bore 80 in downward projection 33. Lock pin 34 is threadably received by interior surface 77 of downward projection 33 and is rotated until upper end 116 of lock pin 34 has been received in and extends through aligned apertures 71 and 108 and until lower end 117 is above first and second openings 93 and 94. When lock pin 34 is so positioned in aligned apertures 71 and 108, first lock body 31 and second lock body 32 cooperate with and obstruct coupler 25 to prevent undesired coupling of coupler 25, and lock pin 34 prevents separation or extension of first lock body 31 and second lock body 32, thus securing locking device 30 in position around coupler 25, as shown in FIG. 9.

When locking device 30 is installed on coupler 25, first lock body 31 and second lock body 32 are slidably separated or extended such that first notch end 106 abuts with first stop 47 and second notch end 107 abuts with second stop 48, providing as much space as possible to accommodate and receive coupler 25. First lock body 31 is then placed around rear facing portion 27 of coupler 25 so that rear facing portion 27 is received in cavity 65. Plate 96 of second lock body 32 is then slidably moved in first and second channels 69 and 70 of first lock body 31 such that front facing portion 26 of coupler 25 is received in slot 114 and band 97 and plate 96 surround front facing portion 26 of coupler 25, as shown in FIGS. 6 and 9. First lock body 31 and second lock body 32 are then slidably adjusted so that aperture 108 of plate 96 is aligned with and above aperture 71 of bottom 42 of first lock body 31. In this position, locking device 30 cooperates with and obstructs coupler 25 to prevent undesired coupling. Lock pin 34 is then rotated by an "ALLEN" wrench, or some other rotating means such as a screwdriver, until lock pin 34 extends into and through aligned apertures 71 and 108, as shown in FIG. 5. So positioned, lock pin 34 prevents the slidable separation or extension of first lock body 31 and second lock body 32, thus securing locking device 30 in position around coupler 25. The "ALLEN" wrench or other rotating means is then removed and shackle 121 of padlock 35 is inserted into and completely through both first opening 93 and second opening 94 in downward projection 33, as shown in FIG. 6, thus preventing access of an "ALLEN" wrench, a screwdriver, or other tool for the rotation of lock pin 34. Padlock 35 may be locked with a key, combination, or other lock means to secure locking device 30 on coupler 25. Locking device 30, so locked, obstructs coupler 25 and prevents undesired access to lock pin 34, undesired removal of locking device 30, and undesired coupling with a towing or pull vehicle.

To remove locking device 30 from coupler 25, padlock 35 is unlocked, shackle 121 is slidably removed from first and second openings 93 and 94, and the "ALLEN" wrench, or other rotating tool, is used to counterrotate lock pin 34 until it is no longer received in aligned apertures 71 and 108. Second lock body 32 is then slidably separated from first lock body 31 so that front facing portion 26 and rear facing portion 27 of coupler 25 can be removed from second lock body 32 and first lock body 31, respectively. The locking device can then be stored in the trailer or towing vehicle until later use is desired. The abutment of first and second notch ends 106 and 107 with first and second stops 47 and 48, respectively, prevent separation of first and second lock bodies 31 and 32 during storage and nonuse.

Figure 10:
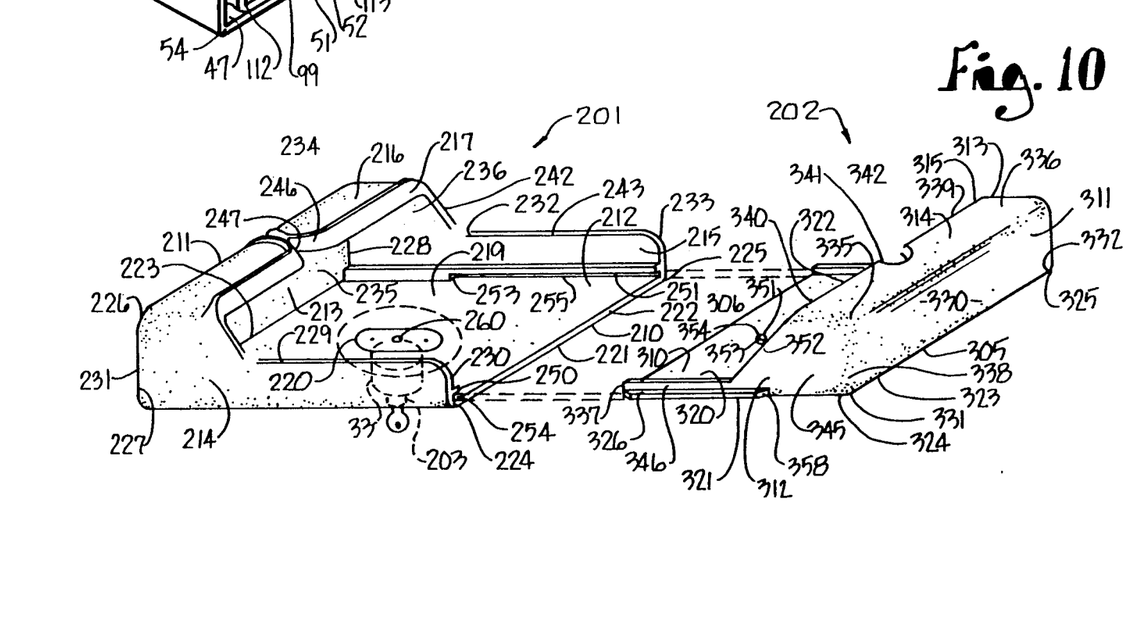
FIG. 10 is a perspective view of the improved locking device embodying this invention and disclosing first and second lock bodies from one another and, in partial phantom lines, a downward projection from the first lock body.

The reference numeral 200, FIGS. 10 through 15, is directed to an improved gooseneck trailer hitch locking device embodying the present invention. Referring to FIG. 10, the improved locking device 200 comprises a first lock body 201, a second lock body 202, and a downward projection 33, the downward projection 33 being an integral component of the first lock body 201 having a lock device 203 to prevent undesired removal of the locking device 200 from a gooseneck trailer hitch 11.

Figure 11:
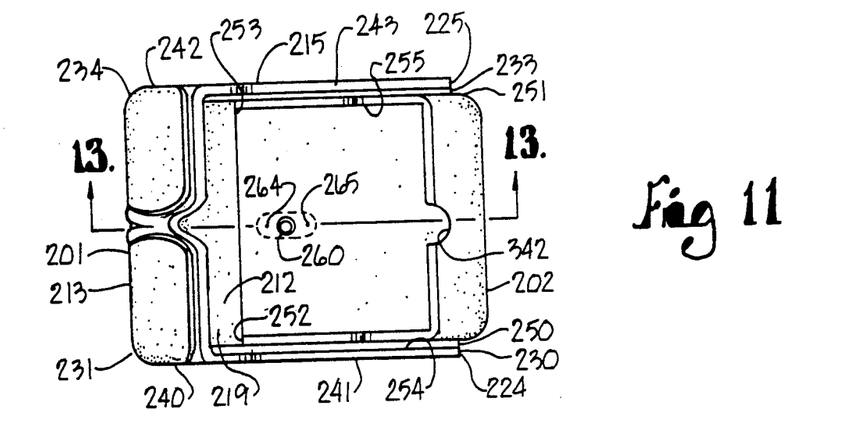
FIG. 11 is a top plan view of the improved locking device with the second lock body fully received in the first lock body and showing an aperture in the second lock body aligned with and above an aperture in the first lock body.

Referring to FIGS. 10 and 11, the first lock body 201 has a front facing end 210 and an opposite rear facing end 211, the front facing end 210 and rear facing end 211 having the same directional aspects, respectively, as the front facing portion 12 and rear facing portion 13 of trailer 10. First lock body includes a bottom 212, an end piece 213, a first upright side 214, a second upright side 215 and a top cover 216.

Bottom 212 of first lock body 201 has a top side 219, bottom side 221, a front facing end 222, a rear facing end 223, a first bottom side end 224, and a second bottom side end 225. Top side 219 has a oval shaped indentation surface 220 that is smooth and generally centrally located on the top side 219. End piece 213 is attached to or integral with, and extends upright from, rear facing end 223 of bottom 212 and has an upper end 226, a first side end 227 and a second side end 228. First upright side 214 is attached to or integral with, and extends upright from, first bottom side end 224 of bottom 212 and has an upper end 229, a front facing end 230, and a rear facing end 231. Second upright side 215 is attached to or integral with, and extends upright from, second bottom side end 225 of bottom 212 and has an upper end 232, a front facing end 233, and a rear facing end 234. The rear facing end 231 of first upright side 214 is fixedly attached to first side end 227 of end piece 213. The rear facing end 234 of second upright side 215 is fixedly attached to second side end 228 of end piece 213. Top cover 216 is fixedly attached to the respective upper ends 229 and 232 of first and second upright sides 214 and 215 and to the upper end 226 of end piece 213. Top cover 216 extends generally parallel to bottom 212 from the upper end 226 of end piece 213 and terminates between front facing end 210 and rear facing end 211 of first lock body 201 so as to form a cavity 235 in an area associated with and in proximity to the rear facing end 211 of first lock body 201. Cavity 235, having a front facing opening 236, is defined by bottom 212, end piece 213, first upright side 214, second upright side 215, and top cover 216, the cavity being adapted to receive the rear facing portion 27 of coupler 25 of gooseneck trailer hitch 11. Top cover 216 also includes a cutout indentation 246 and a top cover front facing end 217. Cutout indentation 246 being located halfway between first upright side 214 and second upright side 215, and adjacent to or integral with the top cover front facing end 217 so as to form an aperture 247 adapted to receive the rear facing portion 24 of the lower end 20 of gooseneck trailer hitch 11.

As best shown in FIGS. 10 and 11, first upright side 214 is identical in shape and dimension as second upright side 215. Second upright side 215 includes a second cover side 242 and a second open side 243. Second cover side 242 extends upright from second upright bottom side end 225 of bottom 212, is attached to or integral with rear facing end 234, and is adjacent to or integral with second open side 243. Second open side 243 extends halfway upright along second upright side 215, and is attached to or integral with front facing end 233.

First upright side 214 also has an inward projection 250 extending inwardly from first upright side 214, and second upright side 215 has an inward projection 251 extending inwardly from second upright side 215. Inward projection 250 is located above, in near proximity to, and generally parallel to, bottom 212. Inward projection 250 extends along upright side 214 between front facing end 230 and rear facing end 231 of first upright side 214. Inward projection 250 is identical in shape and dimension as inward projection 251. Inward projection 250 of first upright side 214 forms a first channel 254 to receive the second lock body 202. Inward projection 251 is located above, in near proximity to, and generally parallel to, bottom 212. Inward projection 251 extends along second upright side 215 between front facing end 233 and rear facing end 234 of second upright side 215. Inward projection 251 further has a second stop 253 located between end piece 213 and front facing end 210. Inward projection 251, second upright side 215, bottom 212, and second stop 253 form a second channel 255 to receive the second lock body 202. In the preferred embodiment, inward projections 250 and 251 extend the full length of the first and second upright sides 214 and 215, respectively.

Figures 12, 13:
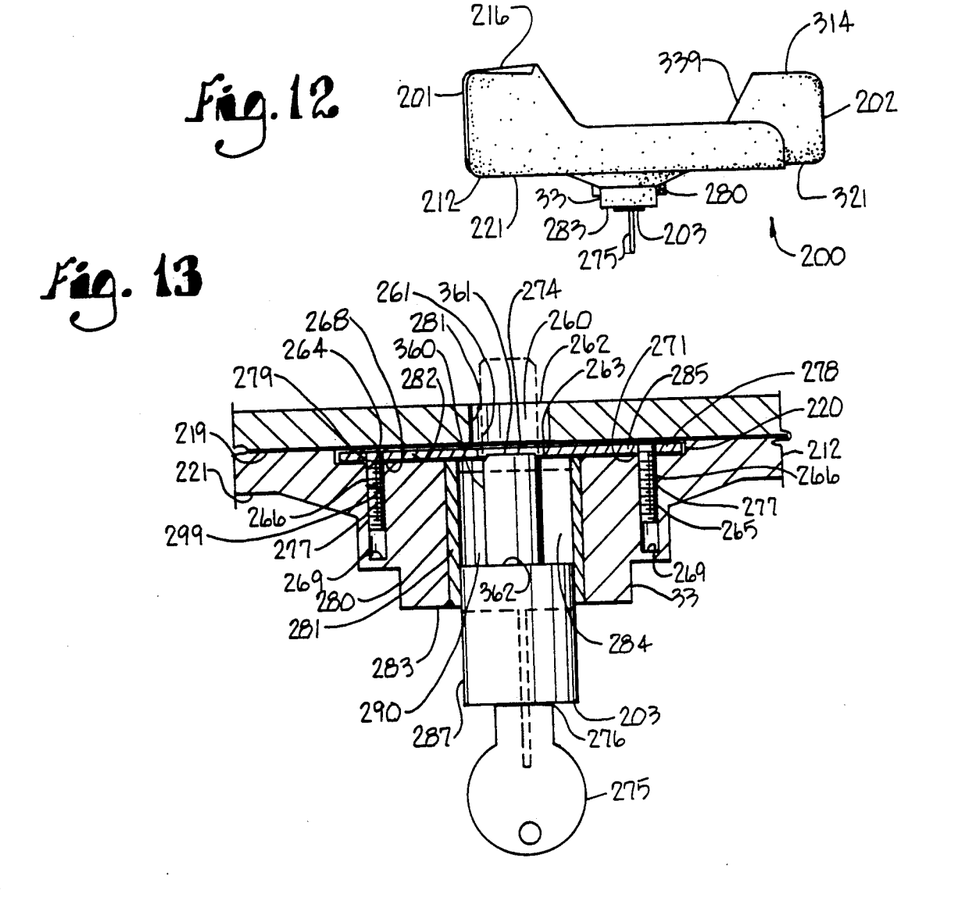
FIG. 12 is a side elevational view of the improved locking device with the second lock body received in the first lock body and showing the downward projection from the first lock body.
FIG. 13 is an enlarged, partially fragmentary, cross-sectional view taken along lines 13—13, FIG. 11, revealing a lock pin disposed in the downward projection and aligned apertures.

As shown in FIGS. 10 and 13, an aperture 260 is generally located in bottom 212 and extends completely therethrough. Aperture 260 is further defined by an interior wall 261 terminating in wall upper edge 262 and wall lower edge 263. Further, a rear facing aperture 264 is generally located along the central horizontal axis of bottom 212 between aperture 260 and end piece 213. A front facing aperture 265 is generally located along the central horizontal axis of bottom 212 between aperture 260 and front facing end 210. Aperture 264 is further defined by interior wall 266 terminating in wall upper edge 268 and wall lower edge 269. Aperture 265 is identical in shape and dimension as aperture 264.

As shown in FIGS. 10, 11, 12 and 13, the downward projection 33 is an integral component of the first lock body 201 that extends downward from the lower side 221 of bottom 212. Downward projection 33 has a locking device 203, a pair of fasteners 277, an exterior wall 280, an interior surface 281, an upper end 282, and a lower end 283. As best shown in FIG. 13, interior surface 281 defines a generally centrally located, longitudinal bore 284 that extends completely through downward projection 33 from upper end 282 to lower end 283. Interior surface 281 is smooth and adapted to receive locking device 203. The upper end 282 of downward projection 33 and the top side 219 of the bottom 212 form the oval shaped indentation 220. The bore 284 is defined by an upper interior smooth surface 290 associated with, and in proximity to, lower end 283.

Figure 15:
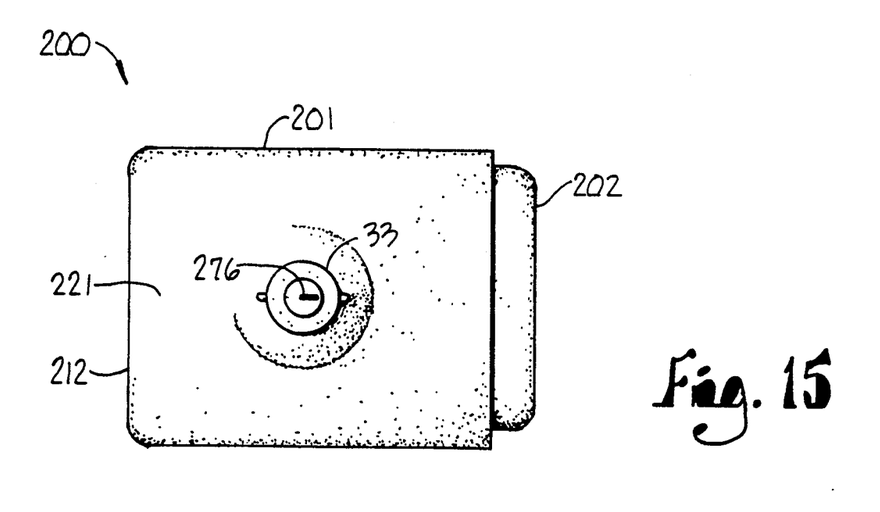
FIG. 15 is a bottom plan view of the improved locking device with the second lock body fully received in the first lock body and showing a downward projection with a lock means from the first lock body fully extended and engaged through the aligned apertures of the first and second lock bodies.

Locking device 203 has a working side 285 having a front fastener aperture 278 and a rear fastener aperture 279. The interior wall 266 of rear facing aperture 264 has a smooth surface 299 that is adapted to receive a fastener 277. The locking device 203 is securely fastened to the oval shaped indentation 220 of the top side 219 of bottom 212 by the pair of fasteners 277, such as rivets, that are inserted through apertures 278 and 279, respectively, of the working side 285 into apertures 265 and 264, respectively. Locking device 203 also has a lock pin 274 of a generally cylindrical shape, a bore insert 287, a key 275 and a key insert 276. The lock pin 274 has a smooth exterior surface 360, and upper end 361, and a lower end 362. The working side 285 generally has the pair of apertures 278 and 279 that are aligned with the apertures 265 and 264, respectively, to allow the fasteners 277 to be inserted and fasten the locking device 203 to the oval shaped indentation 220 of the top side 219 of bottom 212. As best shown in FIG. 15, key 275 is inserted into the key insert 276. By rotating the key 275, the upper end 361 of locking pin 274 is vertically extended outwardly through the aperture 260 from the top side 219 of the bottom 212 such that the lower end 362 is parallel and adjacent to the aperture 260.

As shown in FIG. 10, second lock body 202 comprises a front facing end 305, an opposite rear facing end 306, the front facing end 305 and rear facing end 306 having the same directional aspects, respectively, as front facing portion 12 and rear facing portion 13 of trailer 10. Second lock body 202 includes a bottom 310, an end piece 311, a first upright side 312, a second upright side 313, and a top cover 314.

Bottom 310 of second lock body 202 has an upper side 320, a lower side 321, a front facing end 322, a rear facing end 323, a first bottom side end 324, and a second bottom side end 325. End piece 311 is attached to or integral with, and extends upright from, rear facing end 323 of bottom 310 and has an upper end 330, a first side end 331, and a second side end 332. First upright side 312 is attached to or integral with, and extends upright from, first bottom side end 324 of bottom 310 and has an upper end 335, a front facing end 337, a rear facing end 338, an outward extending projection 326, and an outward projection end 358. Outward extending projection 326 extends along first upright side 312 from front facing end 337 to outward projection end 358. Second upright side 313 is attached to or integral with, and extends upright from, second bottom side end 325 of bottom 310 and has an upper end 336. Second upright side 313 is identical in shape and dimension as first upright side 312. The rear facing end 338 of first upright side 312 is fixedly attached to first side end 331 of end piece 311. Top cover 314 is fixedly attached to the respective upper ends 335 and 336 of first and second upright sides 312 and 313 and to the upper end 330 of end piece 311. Top cover 314 extends generally parallel to bottom 310 from the upper end 330 of end piece 311 and terminates between front facing 305 and rear facing end 306 of second lock body 202 so as to form a cavity 339 in an area associated with and in proximity to the rear facing end 306 of second lock body 202. Cavity 339, having a front facing opening 340, is defined by bottom 310, end piece 311, first upright side 312, second upright side 313, and top cover 314, the cavity being adapted to receive the front facing portion 26 of coupler 25 of gooseneck trailer hitch 11. Top cover 314 also includes a cutout indentation 341 and a top cover front facing end 315. Cutout indentation 341 being located halfway between first upright side 312 and second upright side 313, and adjacent to or integral with the top cover front facing end 315 so as to form an aperture 342 adapted to receive the front facing portion 23 of the lower end 20 of gooseneck trailer hitch 11.

As best shown in FIGS. 10 and 11, first upright side 312 further includes a first cover side 345 and an first open side 346. First cove side 345 extends upright from first bottom side end 324 of bottom 310, is attached to or integral with rear facing end 323, and is adjacent to or integral with first open side 346. First open side 346 extends partially upright along first upright side 312, and is attached to or integral with front facing end 337. Second upright side 313 is identical in shape and dimension as first upright side 312.

As best shown in FIG. 10, second lock body 202 further contains and defines a generally located aperture 351, which extends completely through second lock body 202. Aperture 351 is further defined by an interior wall 352 terminating in wall upper edge 353 and wall lower edge 354.

Rear facing end 306 of bottom of second lock body 202 is adapted to be slidably received in first and second channels 254 and 255 of first lock body 201 such that bottom 310 may be slidably received by first lock body 201 by inserting rear facing end 306 of bottom 310 into first and second channels 254 and 255 at the front facing end 210 of first lock body 201.

Figure 14:
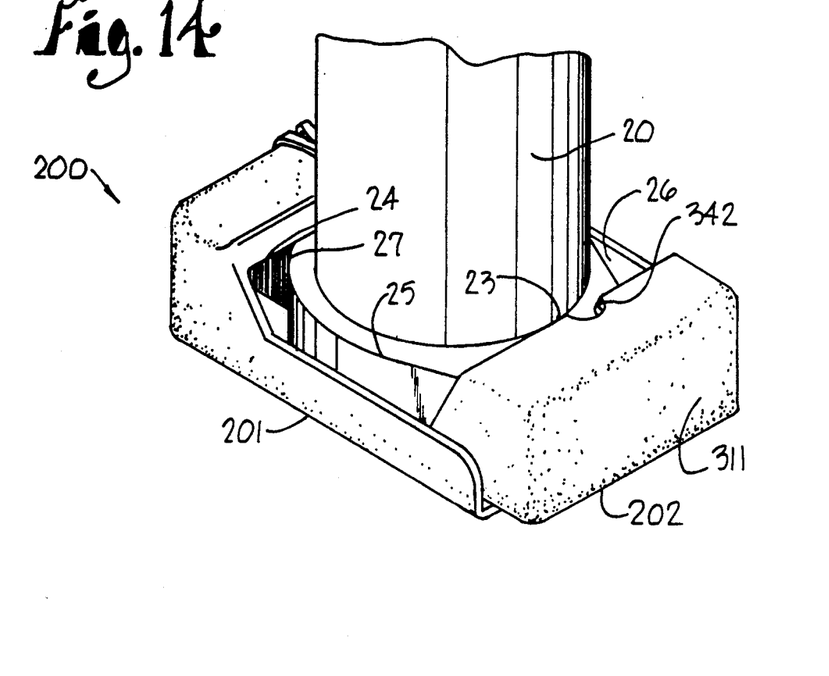
FIG. 14 is a front elevational view of the improved locking device installed and locked on a coupler.

As shown in FIGS. 11 and 13, apertures 260 and 351 are located, respectively, in bottom 212 of first lock body 201 and in bottom 310 of second lock body 202 such that when bottom 310 is slidably adjusted, outward projection 326 of second look body 202 is positioned and slides into first channel 254, aperture 351 can be brought into alignment with and above aperture 260. Apertures 260 and 351 are of sufficient size to receive lock pin 274 through bore 284 in downward projection 33. By inserting and turning key 275 in the key insert 276, lock pin 274 is extended until upper end 361 of lock pin 274 has been received in and extends through aligned apertures 260 and 351 and until lower end 362 is aligned with aperture 260. When lock pin 274 is so positioned in aligned apertures 260 and 351, first lock body 201 and second lock body 202 cooperate with an obstruct coupler 25 to prevent undesired coupling of coupler 25, and lock pin 274 prevents separation or extension of first lock body 201 and second lock body 202, thus securing the improved locking device 200 in position around coupler 25, as shown in FIG. 14.

When the improved locking device 200 is installed on coupler 25, first lock body 201 and second lock body 202 are held apart to accommodate and receive coupler 25. Bottom 310 of second lock body 202 is then inserted and outward projection 326 of second lock body 202 is positioned and slides into first channel 254, and aperture 351 can be brought into alignment with and above aperture 260. First lock body 201 is then placed around rear facing portion 27 of coupler 25 so that aperture 247 of the cutout indentation 246 is adjacent to and receives the rear facing portion 24 of the lower end 20 of gooseneck trailer hitch 11. Second lock body 202 is similarly placed around front facing portion 26 of coupler 25 so that aperture 342 of cutout indentation 341 of the top cover 314 is adjacent to and receives the front facing portion 23 of the lower end 20 of gooseneck trailer hitch 11. First lock body 201 and second lock body 202 are then slidably adjusted so that aperture 351 of bottom 310 is aligned with and above aperture 260 of bottom 212 of first lock body 201. In this position, the improved locking device 200 cooperates with and obstructs coupler 25 to prevent undesired coupling.

To remove the improved locking device 200 from coupler 25, key 275 is inserted in key insert 276 and key 275 is turned, thereby lowering lock pin 274 and allowing first lock body 201 and second lock body 202 to be slidably separated. This allows front facing portion 26 and rear facing portion 27 of coupler 25 to be removed from first lock body 202 and second lock body 201, respectively.

Although certain embodiments of this invention have been illustrated and described, it should be understood that the scope of this invention is not to be limited thereto, except insofar as such limitations are included in the following claims.

What is claimed and desired to be secured by Letters Patent is as follows:

1. A locking device for use with a trailer gooseneck, the trailer gooseneck having a post with upper and lower ends, the upper end being attached to a trailer and the lower end being attached to a coupler, the coupler having front and rear facing portions and being adapted for releasable attachment to a towing vehicle, said locking device comprising:
    (a) a first lock body adapted to receive the rear facing portion of said coupler, said first lock body having a bottom defining an aperture and an interior defining channels;
    (b) a second lock body adapted to receive the front facing portion of said coupler, said second lock body having a bottom defining an aperture, said bottom being adapted to be slidably received in said channels in said first lock body such that the aperture in said bottom of said first lock body can be aligned with and below said aperture in said bottom of said second lock body;
    (c) a projection defining a longitudinal bore extending completely therethrough, said projection attached to and extending down from said bottom of said first lock body such that said aligned apertures in said bottoms of said first and second lock bodies, respectively, can be further aligned with and above said bore when said first and second lock bodies are in cooperation with the coupler;
    (d) a lock pin received by said projection and extending into said bore and said aligned apertures to prevent separation of the first and second lock bodies from said coupler, said lock pin having a length adapted to extend into said bore; and
    (e) lock means at a bottom of said projection so as to prevent undesired access to the lock pin.

2. The locking device of claim 1 wherein said first lock body includes:
    (a) an enclosed end defining a cavity to receive the rear facing portion of the coupler; and
    (b) upright sides having inward extending projections defining channels.

3. The locking device of claim 1 wherein said second lock body includes:
    (a) an enclosed end defining a cavity to receive the front facing portion of the coupler; and
    (b) upright sides having outward extending projections.

4. A locking device for use with a trailer gooseneck, the trailer gooseneck having a post with upper and lower ends, the upper end being attached to a trailer and the lower end being attached to a coupler, the coupler having front and rear facing portions and being adapted for releasable attachment to a towing vehicle, said locking device comprising:
    (a) obstruction means for cooperation with the coupler to prevent undesired coupling of the coupler to the towing vehicle;
    (b) securing means cooperating with said obstruction means to prevent undesired removal of said obstruction means from the coupler;

(c) said obstruction means comprising:
  (i) a first lock body adapted to receive the rear facing portion of the coupler, said first lock body having a bottom defining aperture and an interior defining channels;
  (ii) a second lock body adapted to receive the front facing portion of the coupler, said second lock body having a bottom defining an aperture, said bottom being adapted to be slidably received in said channels of said first lock body such that said aperture in said bottom of said first lock body can be aligned with and below said aperture in said bottom of said second lock body when said lock bodies cooperate to prevent undesired coupling; and
  (iii) said second lock body having upright sides, said sides having outward extending projections;
(d) said securing means comprising:
  (i) a projection defining a longitudinal bore extending completely therethrough, said projection attached to and extending down from said bottom of said first lock body such that said aligned apertures in said bottoms of said first and second lock bodies, respectively, can be further aligned with and above said bore when said first and second lock bodies are in cooperation with the coupler;
  (ii) a lock pin received by said projection and extending into said bore and said aligned apertures to prevent separation of the first and second lock bodies from said coupler, said lock pin having a length adapted to extend into said bore; and
  (iii) lock means at a bottom of said projection so as to prevent undesired access to said lock pin.

5. A locking device for use with a trailer gooseneck, the trailer gooseneck having a post with upper and lower ends, the upper end being attached to a trailer and the lower end being attached to a coupler, the coupler having front and rear facing portions and being adapted for releasable attachment to a towing vehicle, said locking device comprising:
(a) a first lock body adapted to receive the rear facing portion of the coupler;
(b) a second lock body adapted to receive the front facing portion of the coupler, said second lock body being adapted to cooperate with said first lock body;
(c) securing means cooperating with said first and second lock bodies to prevent undesired removal of said first and second lock bodies from the coupler;
(d) said first lock body having a bottom defining an aperture and an interior defining channels;
(e) said second lock body having a bottom defining an aperture, said bottom being adapted to be slidably received in said channels in said first lock body such that said aperture in said bottom of said first lock body can be aligned with and below said aperture in said bottom of said second lock body when said first and second lock bodies cooperate to prevent undesired coupling;
(f) said second lock body having upright sides, said sides having outward extending projections;
(g) said securing means comprising:
  (i) a projection defining a longitudinal bore extending completely therethrough, said projection attached to and extending down from said bottom of said first lock body such that said aligned apertures in said bottoms of said first and second lock bodies, respectively, can be further aligned with and above said bore when said first and second lock bodies are in cooperation with the coupler;
  (ii) a lock pin received by said projection and extending into said bore and said aligned apertures to prevent separation of the first and second lock bodies from said coupler, said lock pin having a length adapted to extend into said bore; and
  (iii) lock means at a bottom of said projection so as to prevent undesired access to said lock pin.

* * * * *